United States Patent [19]

Goto

[11] 4,412,318
[45] Oct. 25, 1983

[54] DEVICE FOR DETECTING INTERBAND GAPS ON RECORD MEDIUM

[75] Inventor: Masao Goto, Tokyo, Japan

[73] Assignee: Sony Corporation, Tokyo, Japan

[21] Appl. No.: 340,538

[22] Filed: Jan. 19, 1982

[30] Foreign Application Priority Data

Jan. 23, 1981 [JP] Japan .................................. 56-9370

[51] Int. Cl.³ .......................... G11B 3/38; G11B 17/06
[52] U.S. Cl. ........................................ 369/41; 369/231
[58] Field of Search ........................... 369/231, 41, 33

[56] References Cited

U.S. PATENT DOCUMENTS 4,142,729 3/1979 McLennan ............................ 369/33
4,375,093 2/1983 Takahashi ............................. 369/41

*Primary Examiner*—Steven L. Stephan
*Attorney, Agent, or Firm*—Lewis H. Eslinger; Alvin Sinderbrand

[57] ABSTRACT

A device for detecting, on a record medium, positions of interband regions disposed between bands of recorded formation on the medium, detects differences in reflectivity of the regions and the bands by emitting electromagnetic radiation to be incident on a recorded surface of the medium containing the bands and regions, and detecting the level of the radiation reflected thereby. A radiation source, such as in LED, emits a beam of radiation to be incident on the medium. A detector, such as a photo transistor, detects the intensity of the beam reflected from the medium and provides an output level that varies with the intensity of the reflected beam. An interband region detecting circuit provides an output signal in response to variations in the output level to indicate the presence of the interband regions. In order to automatically control the current furnished to the radiation source so that the intensity of the reflected beam is maintained within an optimum range of the detector, an average level detecting circuit, which can include an integrator, provides a time average of the detector output to a current control circuit whose output is connected to the radiation source. Thus the emitted level of radiation from the source is automatically increased if the record medium has a low reflectivity, and is automatically decreased if the record medium has a high reflectivity.

8 Claims, 4 Drawing Figures

DEVICE FOR DETECTING INTERBAND GAPS ON RECORD MEDIUM

BACKGROUND OF THE INVENTION

1. Field of the Invention

This invention relates generally to devices for detecting blank or unrecorded portions of a record medium. This invention is more particularly directed to a device for detecting, on a record medium such as a phonograph disc, the positions of unrecorded interband regions, such as interband gaps or rings, which are disposed between bands of recorded information on the record medium. This invention is more specifically directed to such a device which detects differences in the reflectivity of the interband regions and the bands of recorded information by emitting light or other electromagnetic radiation to be incident on the recorded surface of the medium, and then detecting the level of the light that is reflected thereby.

2. Description of the Prior Art

As is commonly known, phonograph discs are formed of a disc substrate having substantially concentric spiral grooves thereon containing audio information, such as music or speech. Typically, the audio information is represented by undulations and variations in the size and depth of the grooves, and the recorded music or speech is picked up by a phonograph stylus guided in the spiral grooves. In a so-called long-playing (LP) disc or "album", several selections of music or other audio sounds are recorded on each side. In such case, each selection is recorded in a separate annular section formed of a plurality of such substantially concentric spiral grooves arranged together in a so-called band. The bands containing the music or other audio information are separated from one another by blank regions, or interband rings, in which no audio information is recorded. Normally, only a shallow guide groove is provided in each such interband ring for guiding the phonograph stylus from the end of one band to the beginning of the next.

Whe such an LP disc is played, the listener often desires to hear only a certain one of the several selections on one of the album sides. To do this, the position of the interband ring immediately preceding the desired band is determined, and the phonograph tone arm is moved to a position directly thereover. Then the tone arm is lowered so that the stylus engages the groove and led into the desired band, and the desired selection is played.

The order of the selections on each album side is virtually always printed on a record label affixed to the center of that album side. Consequently, the listener can easily determine the particular band to be played in order to hear the desired selection. For example, if the listener desires to hear Chopin's minor piano sonata from a particular LP disc, he or she can determine from the label of such disc that the desired selection is, for example, recorded on the third band. Therefore, in order to play this selection, the listener need only move the tone arm to the interband ring between the second and third bands, and lower the tone arm to engage the guide groove therein.

In other recorded media, such as optical discs, the information can be recorded as a series of pits or lands arranged in concentric spiral grooves. In such discs, several selections can be recorded in respective bands with silent or unrecorded rings or gaps disposed therebetween.

The light-reflecting properties of the above LP discs or other discs are quite different at the bands from the corresponding properties at the rings between bands. In the bands, the grooves are packed closely together and, oweing to the information contained therein, are irregular in shape. Consequently, light incident on the bands tends to be scattered or dispersed. In contrast to this, the interband rings are relatively flat, with only a shallow guide groove therein, and incident light tends to be reflected more or less uniformly.

In view of the above characteristics of LP albums and other recorded media, it has been previously proposed to construct a phonograph record player in which the position of the interband ring, leading into a particular band containing a desired musical selection, can be automatically detected. To provide such a phonograph record player it has been proposed to incorporate an interband region detecting device with which a beam of light is emitted to be incident on the recorded surface of the disc, and with which the intensity of the light reflected thereby it detected. Blank portions, that is, the interband rings, can be readily discriminated on the basis of their greater reflectivity. In other words, the interband region detecting device can, for example, provide output pulses whenever greater amounts of reflected light are received, thus identifying the presence of respective interband rings.

The tone arm, or other movable arm of the phonograph, can be adapted to carry light emitting and detecting elements for the interband region detecting device. In such case the tone arm can be swept at a moderate speed over the surface of an LP disc on the phonograph. The detecting device will emit a pulse each time an interband ring is reached. When the tone arm is swept toward a desired band, these pulses are produced and can be counted, for example, in a digital counter. When a preset count is reached, i.e., when a pulse is produced indicating that the tone arm has swept to the position of the interband ring immediately preceding the desired band, the tone arm is automatically stopped and lowered. Then the desired selection is played.

While such previously proposed interband region detecting device is generally sufficient for use with any one particular disc, there are problems that arise from its use if record discs are interchanged on the record player.

Generally, each record disc has a particular light reflectivity which is determined, for example, by the type and quality of the material, the color and smoothness of the surface, and the conditions existing when the particular disc was pressed. Thus, if light of a given intensity is incident on each of a plurality of various record discs, the light reflected from each disc will have a different respective intensity. Accordingly, in the previously proposed device, means are generally incorporated for manually controlling the sensitivity thereof in accordance with the reflectivity of the particular record disc on the phonograph.

Normally, the previously proposed device includes a photodetector, such as a photo diode or photo transistor, for converting the intensity of the reflected light beam into an output current or voltage level. Because of disc-to-disc variations in reflectivity, as mentioned above, the output level of the photodetector could be either too high or too low to provide an accurate indication of the presence of the interband rings.

This defect, rendering it impossible to accurately detect the interband rings for a variety of record discs, is inherent in the previously proposed device. Thus, to avoid this defect, it has been further proposed to include an output controller in association with the photodetector. Such output controller generally takes the form of a manually adjustable variable resistance, whose setting is to be changed in accordance with the reflective qualities of the various record discs to be played.

Unfortunately, the setting of such output controller is quite troublesome and is not entirely reliable. For example, the reflectivity of any particular disc is generally unknown, and the required manual setting must be established by trial and error. Also, because the setting is manual and not automatic, a listener may easily forget to change the setting when changing the record discs, and the device will misoperate accordingly.

For the above reasons, an improved detecting device has been sought which will automatically take into account disc-to-disc variations in surface reflectivity.

OBJECTS AND SUMMARY OF THE INVENTION

Accordingly, it is an object of this invention to provide an improved device for detecting blank portions (e.g., interband rings) on a record disc or other record medium, which device avoids the aforementioned defects and disadvantages inherent in previously-proposed such devices.

It is another object of this invention to provide such a device for detecting blank portions on a record disc which responds to variations in light reflection from the recorded disc to identify the positions of the blank portions, and which will automatically take into account any disc-to-disc variations in the reflectivities of the record discs.

It is yet another object of this invention to provide a device for detecting blank portions on a recorded disc, which device can accurately detect the positions of blank portions on each of various record discs, each having its own particular reflectivity, without the need for troublesome and inconvenient manual adjustment.

It is a further object of this invention to provide a device for detecting blank portions on a record disc in which the intensity of emitted light from a light source is automatically controlled in response to the output level of a photodetector which picks up the light reflected by the record disc, such that the emitted light has a suitable intensity for the particular light reflecting properties of each record disc.

Accordingly, a device embodying this invention is provided for detecting, on a record medium, positions of unrecorded interband regions disposed between bands of recorded information on the medium, in which differences in reflectivity of the bands and interband regions are detected by emitting electromagnetic radiation to be incident on a recorded surface of the medium containing the bands and regions and detecting the level of the radiation reflected thereby. Such a device comprises a radiation source for emitting a beam of the radiation to be incident upon the medium with a beam intensity that varies with a current furnished thereto; a detector for detecting the intensity of the beam reflected from the medium and providing an output level that varies with the intensity of the reflected beam; an interband region detecting circuit having an input coupled to receive the output level of the detector and providing an interband region detection signal in response to variations in the output level; an average level detecting circuit having an input coupled to the detector and an output providing an average level signal in response to a time average of the output level of the detector; and a current control circuit having an input coupled to the output of the average level detecting circuit and an output coupled to the radiation source for controlling the current furnished to the latter, and thereby controlling the intensity of the radiation emitted thereby. With the device having the aforementioned features, the intensity of the reflected beam is automatically maintained within an operable range of the detector and of the detecting circuit, notwithstanding variations from one record medium to another in the reflectivity thereof. In a preferred embodiment, a constant current source is coupled substantially in parallel to this constant current source. The current control circuit can include a voltage amplifier, such as a linearly biased operational amplifier, having an input coupled to the output of the average level detecting circuit and a resistor coupled between the output of the operational amplifier and the radiation source.

Other objects, features, and advantages of this invention will become apparent from the ensuing description of a preferred embodiment thereof when read in conjunction with the accompanying drawings.

DESCRIPTION OF A PREFERRED EMBODIMENT

Figure 1:
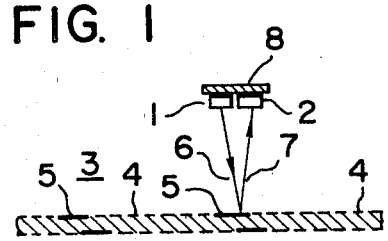
FIG. 1 is a schematic view of a portion of an LP record disc in association with a portion of a previously-proposed device for detecting the locations of unrecorded interband rings thereon.

Initially, to illustrate the background of this invention, to facilitate the understanding thereof, and to emphasize its advantages, an example of a previously-proposed device for detecting blank portions on a record disc will be explained with reference to FIG. 1-3.

In the previously-proposed device, a light source 1, which can be a solid-state device such as an LED or solid-state laser, emits a beam of electromagnetic radiation, such as visible or infrared light. A photodetector 2, such as a photo diode or photo transistor, picks up the beam of light which has been reflected from a recorded surface of a record disc 3. Here, each surface of the record disc 3 is formed of bands 4 containing recorded music, speech, or other information, separated by interband rings or gaps 5 which are blank except for a shallow guide groove leading from one recorded band 4 to the next. As mentioned previously, the bands 4 contain many closely-spaced and generally irregular grooves, and thus tend to scatter incident light, while the interband gaps 4 are substantially flat, and thus tend to reflect light more uniformly. Consequently, if a beam 6 of radiation emitted from the light source 1 is incident upon one of the bands 4, the resulting reflected beam 7 will cause the photodetector 2 to provide a relatively low output level, such as that shown as the signals a₄ in FIG. 2. However, when the beam 6 is incident upon an interband gap 5, which has a relatively higher reflectivity, the reflected beam 7 will have a higher intensity, and will cause the photodetector 2 to provide a relatively higher output level, such as that of pulses a₅ of FIG. 2.

Generally, the light source 1 and the detector 2 are mounted adjacent to one another on a holder 8, which can be attached to a lower portion of the tone arm of a phonograph. Thus, when the holder 8 sweeps across the record at a moderate rate, the positions of the gaps 5 can be identified by the pulses a₅ in the output level of the photodetector 2. Accordingly, when the holder 8 is incorporated into the tone arm of a phonograph, the tone arm can be made to stop when predetermined number of the pulses a₅ have occured, so that the tone arm can be lowered onto the interband gap 5 immediately preceding a desired one of the bands 4. Then, the stylus engages the guide groove in that gap 5, and shortly thereafter begins reproducing the music or speech from the desired band 4.

Figure 2:
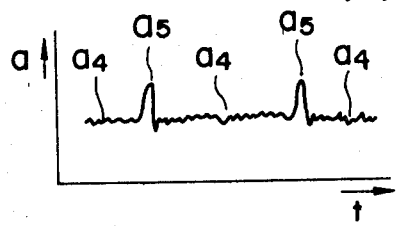
FIG. 2 is a waveform chart of the output of a photodetector of the previously-proposed device shown in part in FIG. 1.
Figure 3:
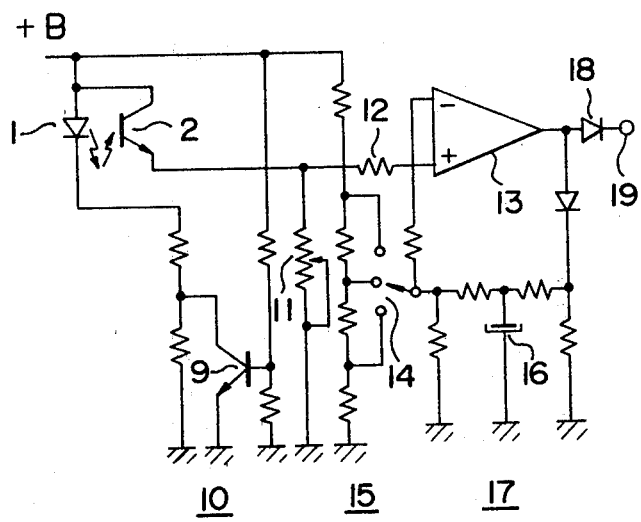
FIG. 3 is a circuit diagram of the previously-proposed device.

Circuit structure typical of such a previously-proposed device is illustrated in FIG. 3. In this device, the light source 1 is an LED whose anode is coupled to a voltage source +B and whose cathode is connected to a constant current source 10 formed of a constant current transistor 9 with conventional biasing circuitry coupled thereto. Also, in the previously-proposed device of FIG. 3, the photodetector 2 is formed of a photo transistor with its collector coupled to the voltage source +B and its emitter coupled through a variable resistor 11 to ground. A slider of the variable resistor 11 can be adjusted to determine the sensitivity of the photo transistor 2. The junction of the emitter of the photo transistor 2 with the variable resistor 11 provides an output voltage level which is furnished through an input resistor 12 to a non-inverting input of an operational amplifier 13. The inverting input terminal of the operational amplifier 13 is coupled through a selector switch 14 to a selected dividing point of a voltage divider 15 arranged as a series of resistors coupled between the voltage source +B and ground. Accordingly, the operational amplifier 13 will operate primarily as a comparator. The selector switch 14 is set to establish a comparing level which is between the levels of the signals a₄ and the pulses a₅ of FIG. 2, in keeping with the reflectivity of the particular record disc 3. A feedback path 17 is formed of a capacitor 16 connected to series resistances $R_{d1}$ and $R_{d2}$. This feedback path 17 ensures that only voltage portions of a large level, such as the pulses a₅, in the output level of the photo transistor 2 will be amplified by the operational amplifier 13. The output of the operational amplifier 13 is furnished through an output diode 18 to an output terminal 19.

The voltage appearing at the terminal 19 is high only when the light beam 6 is incident on unrecorded portions, such as the interband gaps 5, and is low for other regions, such as the recorded bands 4. Thus, with the previously-proposed device as described hereinabove, the positions of the interband gaps or rings 5 can be determined in response to variations in the intensity of the light beam 7 reflected from the record disc 3.

However, in such a previously-proposed blank portion detection device, the intensity of the beam 7 can also be affected by the intrinsic properties of the disc, such as the normal surface reflectivity, the color thereof, the composition of the material used in the disc, and conditions existing when the record disc is pressed. Thus, variations from one disc to another in the light reflectivity thereof can bring about misoperation. That is, for some discs, the intensity of the reflected beam 7 may be so low that the level of the signal provided at the output terminal 19 is always low, and the positions of the interband rings 5 cannot be accurately determined. On the other hand, other record discs may have such a high inherent reflectivity that the level at the output terminal 19 is always high, even when the beam 6 is incident on a recorded portion, such as a band 4.

Accordingly, to maintain the device of FIG. 3 within an operable range, the position of the selector switch 14 has to be changed whenever the record disc is changed on the phonograph. However, as the switch 14 must be set manually, the operation of the device of FIG. 3 is rendered highly inconvenient. Further, because it is likely that a listener may forget to make the proper adjustment of the switch 14 when a disc is changed, or, equally likely, nay not even be aware of what the approprate setting should be, a high degree of misoperation is experienced with the previously-proposed device.

Figure 4:
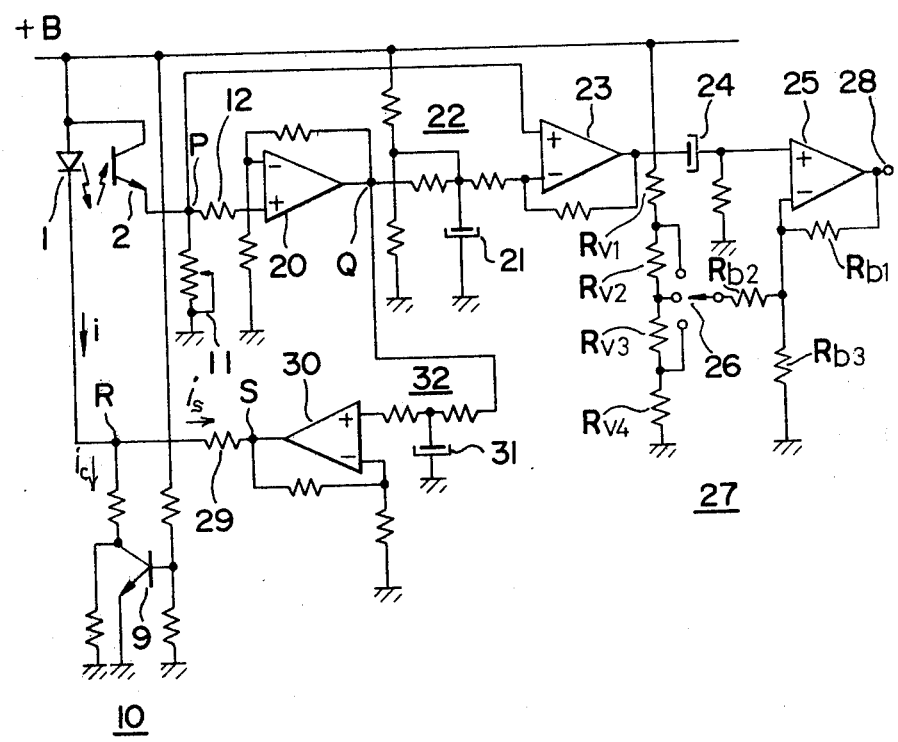
FIG. 4 is a schematic circuit diagram of one embodiment of a device according to the present invention for detecting blank portions, such as interband rings, on a record disc.

In order to cure the disadvantages of the previously-proposed device, the device of this invention, an embodiment of which is illustrated in FIG. 4, includes a current control circuit which automatically increases the current through the LED 1 for record discs of low reflectivity, and automatically decreases the current therethrough for record discs of high reflectivity, so that the intensity of the reflected beam picked up by the photo transistor 2 is maintained within an operable range of the device, notwithstanding disc-to-disc reflectivity variations.

In FIG. 4, elements previously described with respect to FIGS. 1-3 are identified with the same reference characters, and a detailed description thereof is omitted.

In the embodiment of FIG. 4, a junction point P of the photo transistor 2 with the variable resistor 11 is connected through the input resistor 12 to non-inverting input terminal of an operational amplifier 20, which here is biased as a linear amplifier. This operational amplifier 20 has an output Q coupled through an integrator circuit 22, which includes a capacitor 21, to an inverting input terminal of another operational amplifier 23 coupled as a differential amplifier. The non-inverting input terminal of this operational amplifier 23 is connected to the junction point P, and the output thereof is connected through a coupling capacitor 24 to an output operational amplifier 25, here biased as a comparator. An inverting input of the operational amplifier 25 is coupled through biasing resistances $R_{b1}$, $R_{b2}$, and $R_{b3}$ to the output thereof, to a selector switch 26, and to ground, respectively. The selector switch 26 is then connected to a variable biasing arrangement 27 formed of a series of resistances $R_{v1}$-$R_{v4}$ connected between the voltage source +B and ground. The switch 26 has a moveable contact coupled to the resistance $R_{b2}$, and fixed contacts respectively coupled to the junctions of the resistances $R_{v1}$ and $R_{v2}$, $R_{v2}$ and $R_{v3}$, and $R_{v3}$ and $R_{v4}$. The cathode of the LED 1 is connected to an input terminal R of the constant current source 10, which provides a constant current $i_c$ thereto.

A controlled variable current source is formed of a resistor 29 having one end connected to the input terminal R and another end connected to a circuit point S which is the output of an operational amplifier 30 biased as a voltage gain amplifier. A non-inverting input of this operational amplifier 30 is coupled to the point Q by means of an integrator circuit 32 containing a capacitor 31. The integrator circuit 32 provides a time average of the output of the operational amplifier 20. Thus, at the point S there will appear a voltage which is proportional to the time average voltage level at the point P. The resistor 29, which bridges the points R and S, will then admit a current $i_s$ which increases as the voltage at the point S decreases. The resulting current i flowing through the LED 1 will be the sum of the constant current $i_c$ and the controlled current $i_s$.

The operational amplifier 23 operates as a subtracting circuit to determine the difference between the level at the point P and a time average thereof provided by the integrator circuit 22. Accordingly, when radiation is incident of the rings 5, the output level at the point P appears as the voltage pulses $a_5$ and the same are applied through the coupling capacitor 24 to the output operational amplifier 25. The latter subtractively amplifies the pulses $a_5$. That is, the level determined by the setting of the selector switch 26 is compared with the voltage supplied through the coupling capacitor 24, so that voltages of high level appear at the output terminal 28 in correspondence with blank portions, such as the interband rings 5 on the record disc 3.

In the above-described embodiment, the selector switch 26 and the variable resistor 11 can be adjusted to determine the sensitivity of the output of the operational amplifier 25.

The amplified output of the photo transistor 2 is also applied from the point Q to the integrator circuit 32. Thus, the integrator circuit 32 operates as a level detecting circuit and provides to the non-inverting input of the operational amplifier 30 a signal that corresponds to the time-averaged level of the output of the photo transistor 2. In consequence, the operational amplifier 30 acts as a voltage amplifier so that a voltage corresponding to the time-averaged level appears at the point S. Because the operational amplifier 30 has a relatively low output impedance, the amplifier acts as a current sink, and the current $i_s$ flowing to the point S through the resistor 29 will vary in proportion to the voltage at the point S. That is, when the integrated output of the integrating circuit 32 has a low level, the voltage at the output of the operational amplifier 30 will also be low, so that the current $i_s$ flowing to the point S through the resistor 29 increases. The total current i flowing through the LED 1 also increases so that the beam of emitted light becomes correspondingly stronger. Conversely, if the integrated output of the integrating circuit 32 is relatively high, the current $i_s$ flowing through the resistor 20 decreases and the total current i flowing through the LED 1 decreases by the same amount so that the LED 1 emits a correspondingly weaker beam.

It can be seen from the foregoing that the integrator circuit 32 and the current control circuit formed of the resistor 29 and the operational amplifier 30 together constitute a feed-back circuit to control the intensity of the beam emitted from the LED 1. In other words, the intensity of the radiation beam 6 incident upon the surface of the record disc 3 is controlled in response to the average intensty of the reflected beam 7 received by the photo transistor 2.

When the beam of light 6 emitted from the transistor 1 scans across the recorded surface of the record disc 3, the relatively strong light reflected by blank portions, such as the interband rings 5, will be sufficiently stronger than the average level so that the positions of the interband rings 5 will be represented by pulses appearing at the output terminal 28. However, if the surface characteristics of the record disc 3 are such that the recorded bands 4 have a relatively high reflectivity, the operational amplifier 30 will reduce the strength of the beam incident upon the surface of the record disc 3, so that the positions of the interband rings 5 can be readily distinguished.

As mentioned previously, the LED 1 and photo transistor 2 are favorably mounted on the record tone arm of a phonograph. These elements 1, 2 can also be mounted on a separate arm or other device which is capable of sweeping at a moderate rate of speed across the surface of the record disc. Accordingly, the values of the capacitors 21 and 31 should be selected such that the integrator circuits 22 and 32 will have time constants on the order of the duration of a sweep of the tone arm across each of the interband rings. In a favorable embodiment, it is preferred that these integrator circuits 22 and 32 have time constants selected to be about $\frac{1}{3}$ second.

As is apparent from the foregoing description, with the interband gap detecting device according to this invention, it is unnecessary for the listener to manually adjust any circuit settings merely to accommodate discs with different light reflecting properties. Furthermore, the locations of the interband gaps or rings can be reliably determined even if the light reflecting properties of any particular disc are unknown. Because the intensity of the incident beam emitted from the LED 1 is controlled in response to the average intensity of the reflected beam received by the photo transistor 2, the positions of the interband gaps for any of a wide variety of records can be identified, regardless of variations in the quality of the record substrate material, the color thereof, or the manufacturing procedures used in pressing the record disc. Accordingly, the reliability of detection of blank portions, such as these interband gaps, is greatly enhanced with this invention.

Incidently, because the four operational amplifiers 20, 23, 25, and 30 can be easily formed on a single chip, such as a type 324 operational amplifier, the circuit of the device shown in FIG. 4 can be fabricated inexpensively, and can be made extremely compact.

It is also possible to omit the resistor $R_{b1}$ from the operational amplifier 25.

While certain concrete structure has been shown with the illustrative embodiment of FIG. 4, it is noted that the invention is not limited to that embodiment. For example, the radiation source 1 is not limited to being an LED, as a solid state laser, incandescent lamp, or other electromagnetic-radiation emitter could be used. Also, while the current source 10 is illustrated to include a junction transistor 9, equivalent circuit construction could be substituted therefore.

It is further noted that the present invention is not limited solely to the detection of blank portions of a long playing audio disc, but could be used in many other environments where the reflectivity of the respective medium containing recorded information is different from that of unrecorded regions of the medium.

Although an illustrative embodiment of this invention has been described in detail hereinabove with reference to the accompanying drawings, it is to be understood that the invention is not limited to that precise embodiment, and that many changes and modifications can be effected therein by one skilled in the art without departing from the scope or spirit of this invention as defined in the appended claims.

What is claimed is:

1. A device for detecting, on a record medium, positions of unrecorded interband regions disposed between bands of recorded information on said medium, in which differences in reflectivity of said regions and said bands are detected by emitting electromagnetic radiation to be incident on a recorded surface of said medium containing said bands and regions and detecting the level of the radiation reflected thereby, comprising a radiation source for emitting a beam of said radiation to be incident upon said medium with a beam intensity that varies with a current furnished thereto;

detector means detecting the intensity of the beam reflected from said medium and providing an output level that varies with the intensity of the reflected beam;

interband region detecting circuit means having an input coupled to receive the output level of said detector means and providing an interband region detection signal in response to variations in said output level;

average level detecting means having an input coupled to said detector means and an output providing an average level signal in response to a time average of said output level; and current control means having an input coupled to the output of said average level detecting means and an output coupled to said radiation source for controlling said current furnished to the same and thereby controlling the intensity of said radiation emitted thereby, such that the intensity of the reflected beam is automatically maintained within an operable range of said detector means and detecting circuit means notwithstanding variations from one record medium to another in the reflectivity thereof.

2. A device for detecting positions of interband regions according to claim 1, further comprising a constant current source, connected substantially in parallel to said current control means and having a current source terminal coupled to said radiation source.

3. A device for detecting positions of interband regions according to claim 2, wherein said current control means includes a voltage amplifier having an input coupled to the output of said average level detecting means and an output, and a resistor coupled between such output and the current source terminal of said constant current source.

4. A device for detecting positions of interband regions according to claim 1, wherein said average level detecting means includes a linearly-biased operational amplifier having an input coupled to said detector means to receive said output level, and an output; and integrating circuit means coupled between such output and the input of said current control means.

5. A device for detecting positions of interband regions according to claim 4, wherein said interband region detecting circuit means includes another operational amplifier having one input terminal connected as said input to receive said output level of said detector means, a reference input, and an output; second integrating circuit means coupled between the output of said linearly biased operational amplifier and said reference input; and output signal circuit means coupled to said output of said second operational amplifier to provide said detection signal.

6. A device for detecting positions of interband regions according to claim 5, wherein said output signal circuit means includes a third operational amplifier arranged as a voltage comparator and having first and second input terminals and an output terminal providing said interband region detecting signal; a coupling capacitor connecting the output of said second operational amplifier to the first input terminal of said third operational amplifier; and biasing means providing a predetermined reference voltage to said second input terminal of said third operational amplifier.

7. A device for detecting positions of interband regions according to claim 5, wherein said medium is a phonograph disc, said bands are annular bands of recorded information and said interband regions are interband rings disposed between successive such annular bands on said recorded surface of said disc; wherein said radiation source and detector means are disposed on a movable arm of a player for said disc, said arm being adapted to sweep across said recorded surface of the disc at a predetermined sweep speed until the tone arm reaches the position of a desired one of said interband regions; and wherein the first-mentioned and said second integrating circuit means have respective time constants selected to be on the order of the duration of a sweep of said arm, at said predetermined sweep rate, across each of said interband rings.

8. A device for detecting positions of interband regions according to claim 5, wherein the first-mentioned and said second integrating circuit means have respective time constants selected to be on the order of $\frac{1}{3}$ second.

* * * * *